(12) United States Patent
Rebich (10) Patent No.: US 10,948,378 B2
(45) Date of Patent: Mar. 16, 2021

(54) DEVICE, SYSTEM, AND METHOD FOR DETECTING EQUIPMENT LEAKS

(71) Applicant: Nick Rebich, Grove City, OH (US)

(72) Inventor: Nick Rebich, Grove City, OH (US)

( * ) Notice: Subject to any disclaimer, the term of this patent is extended or adjusted under 35 U.S.C. 154(b) by 142 days.

(21) Appl. No.: 16/377,366

(22) Filed: Apr. 8, 2019

(65) Prior Publication Data
US 2019/0339155 A1 Nov. 7, 2019

Related U.S. Application Data

(60) Provisional application No. 62/666,332, filed on May 3, 2018.

(51) Int. Cl.
*G01M 3/28* (2006.01)
*G01M 3/36* (2006.01)
*G01M 3/00* (2006.01)
*F17D 5/02* (2006.01)

(52) U.S. Cl.
CPC .................. *G01M 3/28* (2013.01); *F17D 5/02* (2013.01); *G01M 3/007* (2013.01); *G01M 3/366* (2013.01)

(58) Field of Classification Search
CPC ......... G01M 3/28; G01M 3/007; G01M 3/366
USPC ............................................................ 73/40
See application file for complete search history.

(56) References Cited

U.S. PATENT DOCUMENTS

| 7,107,822 B2 * | 9/2006 | Zachary | F16K 5/0663 73/46 |
| 2014/0161587 A1 * | 6/2014 | Shamseldin | F04D 29/124 415/1 |

* cited by examiner

*Primary Examiner* — John Fitzgerald
*Assistant Examiner* — Rodney T Frank
(74) *Attorney, Agent, or Firm* — Wright, Lindsey & Jennings LLP; K. Brandon Middleton (57) ABSTRACT

A device, system, and method for detecting a leak (and determining the leak rate of the leak) for equipment, particularly generators, the device including a main body connected to the tested equipment and to an air supply source, wherein the main body includes a number of stages each having a valve and orifice such that flow of air through the independent stages is selectively controllable, where a change in the differential pressure recorded during flow of the air through a particular stage indicates a leak, and wherein the differential pressure recorded can be used to calculate the rate of leak in the equipment.

14 Claims, 4 Drawing Sheets

DEVICE, SYSTEM, AND METHOD FOR DETECTING EQUIPMENT LEAKS

CROSS-REFERENCE TO RELATED APPLICATIONS

This application claims priority from U.S. provisional patent application No. 62/666,332, filed on May 3, 2018, and entitled "Accurate Leak Rate Tester Device, System, and Method." Such application is incorporated by reference herein in its entirety.

STATEMENT REGARDING FEDERALLY SPONSORED RESEARCH OR DEVELOPMENT

Not applicable.

BACKGROUND OF THE INVENTION

Dedicated, utility owned electrical power generating stations are the major sources of large amounts (Mega Watts and MVARs) of electrical energy required to provide the world's industrial, commercial and residential networks with reliable and stable electrical power. Many of these large power producing generators are designed to operate using pure hydrogen as a cooling media within the generator stator casing. In many cases the "larger" of the machines also utilize low conductivity water to provide direct cooling of the copper conductors via small passages within the strands that make up the generator stator armature coils (sometimes referred to as stator bars). Typically the volume of a cooling water circuit is 8 to 20 cubic feet depending on the size and design of the machine. During operation, power plant operations personnel closely monitor generator operating temperatures and subsequent hydrogen pressure and purity. It is imperative to maintain both hydrogen purity as well as hydrogen pressure to insure that the machine safely operates within its capability curve to obtain maximum output. When a change or increase in the amount of "make up" hydrogen needed to maintain pressure occurs, the operators are alerted that a leak is occurring and must investigate to determine the leak source.

Generally speaking, there are two ways by which hydrogen can escape the generator casing. The first and most obvious path of escape is through the casing into the surrounding environment though end shield and manway gaskets, instrument cable penetrations (resistance temperature detectors, thermocouples, air gap flux probes, etc.), generator main terminal leads or high voltage bushings, rotor shaft seals, piping, or other similar leak prone areas. These particular leak prone areas are traditionally investigated by operators using hand held localized portable gas detectors and/or sonic listening devices. If a leak source is located, repairs (usually temporary) are performed so that operation can continue until the next scheduled maintenance outage when appropriate corrections can be safely achieved.

The second potential path for hydrogen leakage (thus resulting in an increase in hydrogen consumption) occurs within the liquid cooled armature winding circuit, which is housed within the generator casing and which commonly uses water or oil as a coolant. Typically and by design, a differential pressure exists between the water cooling circuit (lower pressure) and the hydrogen casing pressure (higher pressure) so that in an event that the liquid cooling circuit develops a leak, the higher pressure hydrogen will infiltrate the water passage to prevent and/or delay moisture from leaking or "wicking" via capillary action into the generator stator armature coil insulation. If left uncorrected, moisture in the coil insulation will eventually lead to reduced dielectric strength of the insulation system resulting in a damaging stator phase to phase or ground fault. This will result in the occurrence of a generator trip or shutdown, which may be referred to as an "emergency forced outage."

Loss of a major power producing generator due to an emergency forced outage can be very costly (some estimate about $1000 per MW per day in losses) and can also jeopardize the stability of the transmission and distribution grid, ultimately resulting in power outages on the system. For this reason, it is crucial to expeditiously isolate and determine the root cause of any fault, whether the cause is a leak in the winding or another mechanism resulting in dielectric breakdown of the stator armature insulation.

Liquid Cooled Generator Stator Windings (LCSW) Testing Applications

Traditional leak testing, and the testing procedure most widely used today is commonly referred to as pressure and vacuum decay testing. This traditional testing technique is performed during planned maintenance outages (or as a result of an emergency forced outage as described above) and requires that the cooling water be gravity drained before applying bursts of pressurized air to further dry the system (aka blowdown). After blowdown a vacuum is applied to further remove (or "boil out") the remaining moisture. This drying process typically takes twenty-four to forty-eight hours or even longer. After the drying process is complete (and with vacuum still applied) a one hour vacuum decay test is performed. Results from this test are compared to the original equipment manufacturer (OEM) permissible vacuum decay leak rate in standard cubic feet per day (SCFD). The standard acceptable leak rate is typically less than 3 SCFD. Next, the water circuit is pressurized with air and isolated containing the OEM recommended positive air pressure for testing (usually 45-75 psig). Monitoring and recording takes place every hour for 24 hours followed by a calculation of a theoretical leak rate that corrects the absolute pressure measurements to standard temperature and pressure. These results are then compared to the OEM's recommended permissible leak rate for pressure decay (typically less than 1 SCFD). It should be noted, however, that not all leaks can be detected by performing only one of the vacuum decay and pressure decay testing. This is because it is not uncommon, based on the geometry of a leak, for the insulation surrounding the leak to act as a "check valve" that pulls closed under vacuum (therefore indicating no leak) but that exhausts under pressure. Thus, it is necessary to perform both tests in order to locate and identify a leak.

Generator Casing Leaks Testing Applications

When large hydrogen cooled generators are reassembled following a scheduled maintenance or unplanned forced outage, a generator casing leak test must be performed to insure that the minimal OEM prescribed leak rate is achieved. This is necessary to maintain needed pressure for cooling and to minimize escape of hydrogen into the surrounding environment through gaskets, seals, instrument lead glands, etc. Currently this is performed by conventional time weighted pressure decay testing that is subject to environmental influences and temperature reference points for accuracy (similar to the LCSW application described above). Because of the large volume and the nature of the numerous casing to outside environment interface locations (manway covers, cable penetrations, bearings, etc.), and methods to prevent leakage (pumped in sealant, gaskets, labyrinth seals, etc.), the minimum recommended leak rates are much higher and can be as high as 800 SCFD for final assembly.

Unfortunately, as indicated above, these testing procedures are very technical, and because in LCSW scenarios both tests must be performed, a significant amount of equipment, set-up time, and testing time is required. For example, the LSCW testing procedure typically requires a flatbed semi-trailer for mobilization and a 480 VAC power feed, and both tests typically require. Furthermore, these tests are quite subjective and often not repeatable due to the fact that over the long testing period environmental factors (such as air temperature and barometric pressure) are changing. Because the leak rate is calculated on an hour-by-hour basis over the lengthy testing period, changes in these factors can play a major role in the calculated rate. For example, accuracy of leak rate calculation may be affected by the air temperature of a reference location within the generator's liquid cooled generator stator windings (LCSW), particularly on generators located outdoors— where temperatures change significantly over 24 hour periods and do not change evenly throughout the LCSW circuit (parts of the circuit are embedded in the insulated copper conductors which are installed in an iron core while other components like Teflon hoses, inlet and outlet piping, and distribution headers are directly exposed to environment surrounding the generator casing and can change quickly).

All of these factors can have a significant impact on reducing the accuracy of leak rate calculations, and a new system, device, and method of testing for leaks in these types of equipment is needed.

BRIEF SUMMARY OF THE INVENTION

Generally speaking, the present invention is directed to a device, system, and method useful for accurately and expeditiously testing leak rates in hydrogen and liquid cooled electrical generator stator casings and armature windings of large industrial equipment, particularly steam turbine generators of all makes and sizes. In particular, the present invention is useful for and intended to be used for testing and quantifying leak rates in both liquid cooled generator stator windings (LCSW) and hydrogen cooled generator stator casings of steam turbine generators. While it is understood that the invention may be adapted for use with various pieces of equipment, the preferred use is for leak testing of steam turbine generators. For this reason, descriptions of the invention herein may refer specifically to testing of generators, but the invention is not so limited.

It is an object of the present invention to overcome the shortcomings of the traditional pressure and vacuum decay testing methods (time-consuming, costly, and large equipment requirements). For this reason, the present invention does not utilize the conventional pressure decay test methods. Instead, the present invention presents a novel device and method that incorporates principles of physics contained in Boyle's Law and Bernoulli's Principle coupled with laboratory and experimentally derived algorithms for measuring leak rates ranging from minute direct leak rates (typical of leaks within the water cooled stator/armature winding circuit resulting from component material porosity or chemical attack of the phosphorus rich copper braze alloy where small voids exist) to very large leak rates (typical of generator casing leaks). This is achieved by metering air flow via a precisely monitored and maintained source air pressure, custom made 45 degree conic edge orifice adapters (useful for even lower Reynolds numbers), and a specially manufactured high pressure Differential Pressure gauge. The present invention directly measures air flow through the leak under maintained test pressure and provides the positive pressure leak rate in SCFD in less than three hours (compared to the 24 hour or longer period used by current testing methods). The present invention may be used to accurately measure leak rates from as low as 0.053 SCFD to greater than 1200 SCFD in less than 3 hours.

The testing device, system, and procedure of the present invention can be used on any OEM liquid cooled generator stator armature winding and generator casing. It is recommended that OEM acceptance criteria and prescribed test pressures be followed. An improvement over traditional testing equipment and procedures, the testing equipment of the present invention is lightweight, portable, accurate, repeatable, and independent of test/generator volume and ambient conditions. Furthermore, while traditional equipment and techniques require substantial downtime for testing, the present invention requires less than 3 hours to provide results. Furthermore, the calculation software included with the testing system of the present invention allows for the immediate calculation of summarized results corrected to STP with a "pass or fail" flag for LCSW testing.

The following guidelines are believed to provide general examples of timing required for testing (but, of course, the testing procedure should be performed until the differential pressure maintains a steady reading for 20 minutes, as described more fully below with regard to the testing procedure of the present invention): (a) for volumes of less than 1 cubic foot, it is believed that stabilization will occur in less than 30 minutes, (b) for volumes greater than 1 cubic foot but less than 5 cubic feet, it is believed that stabilization will occur in less than 40 to 60 minutes, and (c) for volumes greater than 5 cubic feet, it is believed that stabilization will occur in less than 40 to 120 minutes. Given these guidelines, it is believed that the testing equipment and procedure of the present invention can save at least 24 hours over traditional testing equipment and methods. Thus, determining leak rates utilizing the present invention directly allows for the quick determination of work scope and logistics for repairs, ultimately reducing outage time and saving a substantial amount of money. As described more fully below with regard to the preferred testing procedure, the testing equipment of the present invention can be utilized after a gravity drain only (thus eliminating the need for the "blow down" stage and vacuum drying process required by traditional testing methods and equipment), saving an additional 24 to 48 hours. This improvement over the existing technology in this field is a result of the present inventions independence relative to the volume being tested. Furthermore, because the duration that the LCSW is under test pressure vs. blowdown pressures is substantially reduced, there is minimal risk of forcing moisture migration into the insulation system. Altogether, the technology of the present invention is an improvement over the traditional technology utilized to the tune of an estimated 48 to 72 hour time savings (in the scenario of a LCSW leak forced outage) and time savings in other applications as well.

These and other objects, features, and advantages of the present invention will become better understood from a consideration of the following detailed description of the preferred embodiments and appended claims in conjunction with the drawings as described following:

DETAILED DESCRIPTION OF THE INVENTION

Generally speaking, the present invention is directed to a device, system, and method useful for accurately and expeditiously testing leak rates in hydrogen and liquid cooled electrical generator stator casings and armature windings of large industrial equipment, particularly steam turbine generators of all makes and sizes. In particular, the present invention is useful for and intended to be used for testing and quantifying leak rates in both liquid cooled generator stator windings (LCSW) and hydrogen cooled generator stator casings of steam turbine generators. The present invention utilizes Boyle's Law and Bernoulli's Principle coupled with laboratory and experimentally derived algorithms for measuring very minute leak rates using a specially manufactured high pressure differential pressure gauge and specially manufactured orifices for variable leak rates provided in stages. The algorithms are preferably incorporated into a computer-based form (such as an EXCEL spreadsheet) that allows the user to obtain instantly calculated results. Thus, in one embodiment, the present invention includes the testing equipment, calculations software, Instructions, and tooling to allow the user to conduct pressurized device self-leak and calibration tests, in addition to the method of use of the device for detecting a leak and determining the leak rate.

Figure 1:
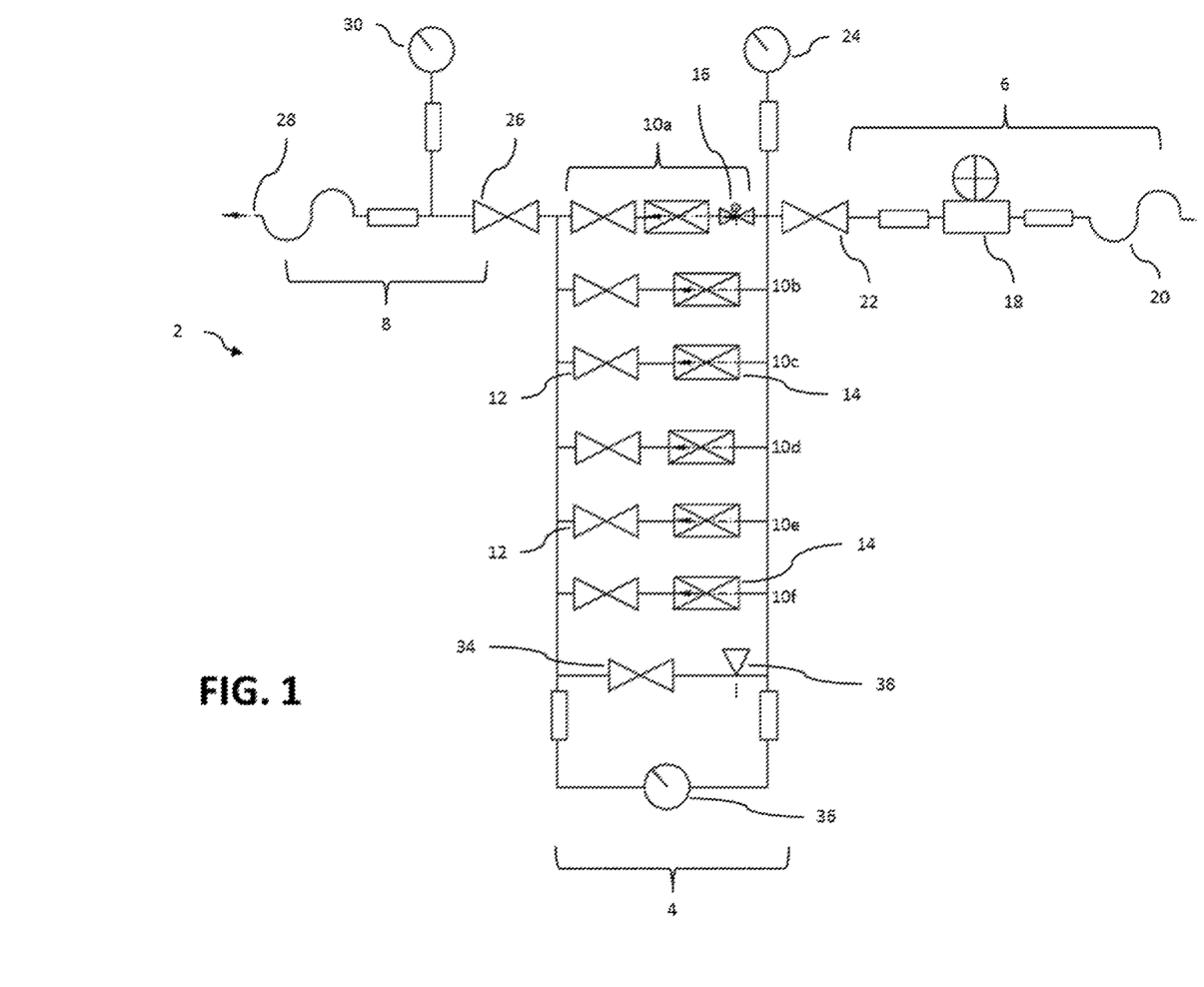
FIG. 1 is a schematic diagram representing one embodiment of the testing device of the present invention.
Figure 2:
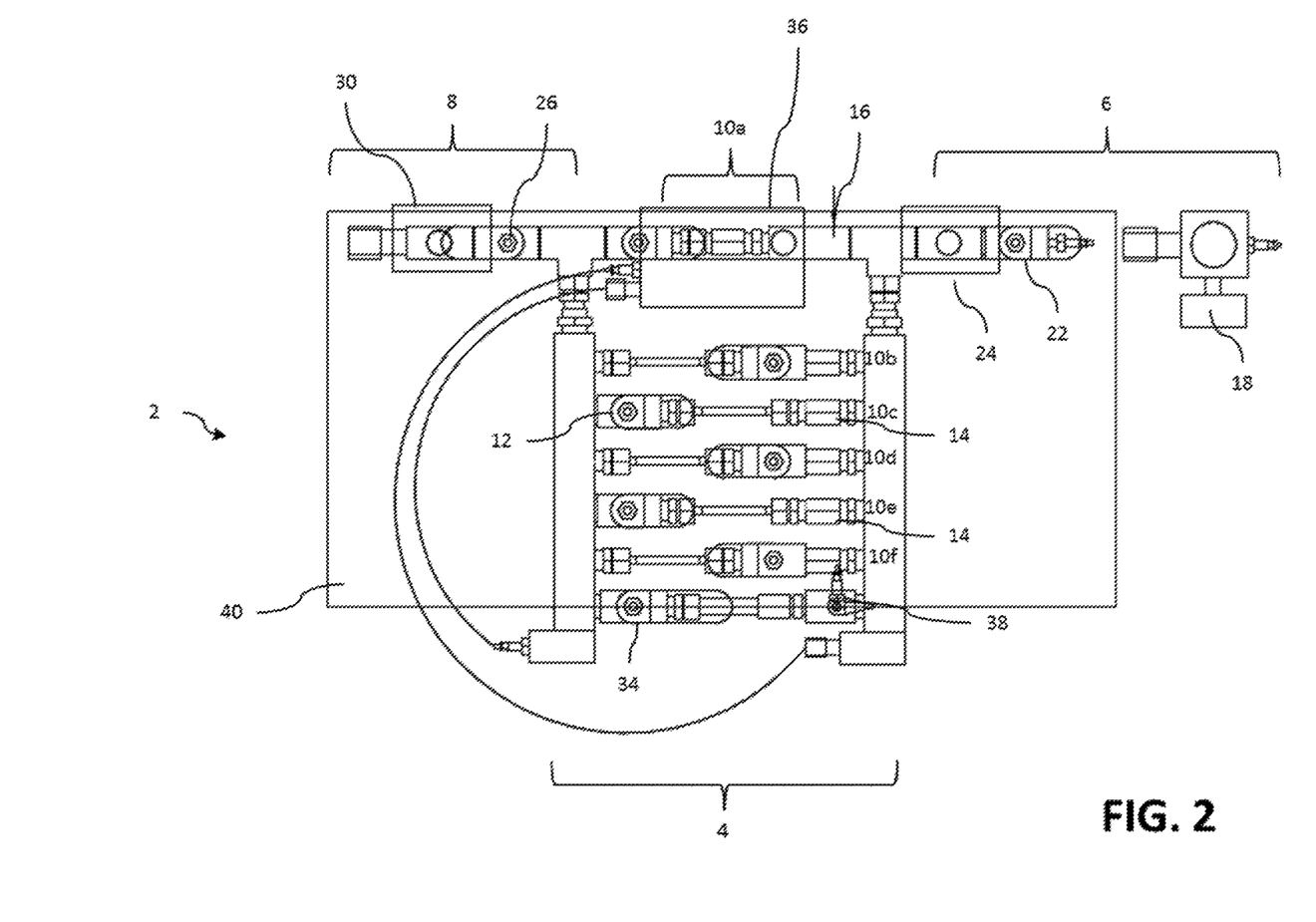
FIG. 2 is a plan view drawing showing one embodiment of the testing device of the present invention.
Figure 3:
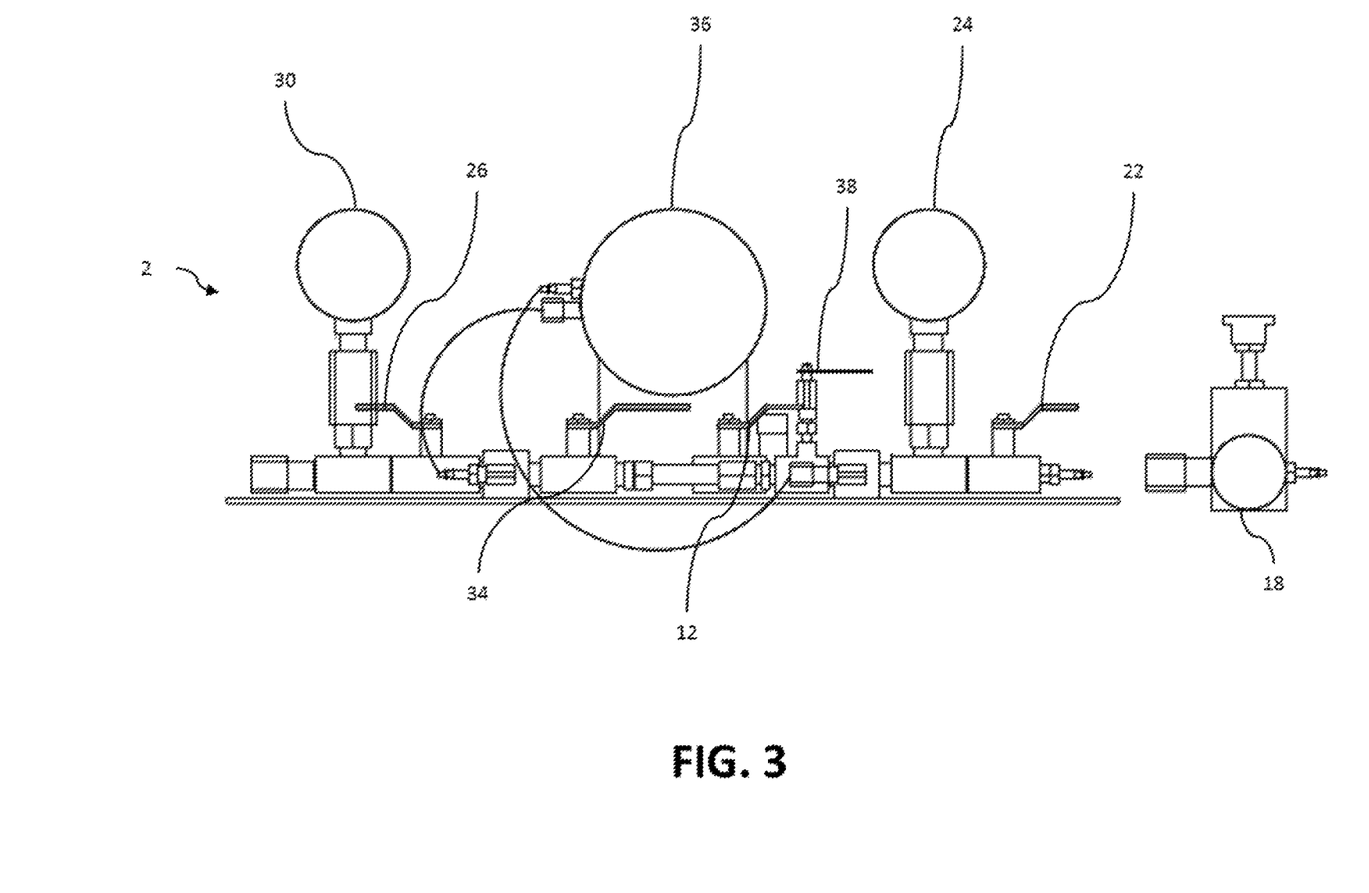
FIG. 3 is a front elevation view drawing showing one embodiment of the testing device of the present invention.
Figure 4:
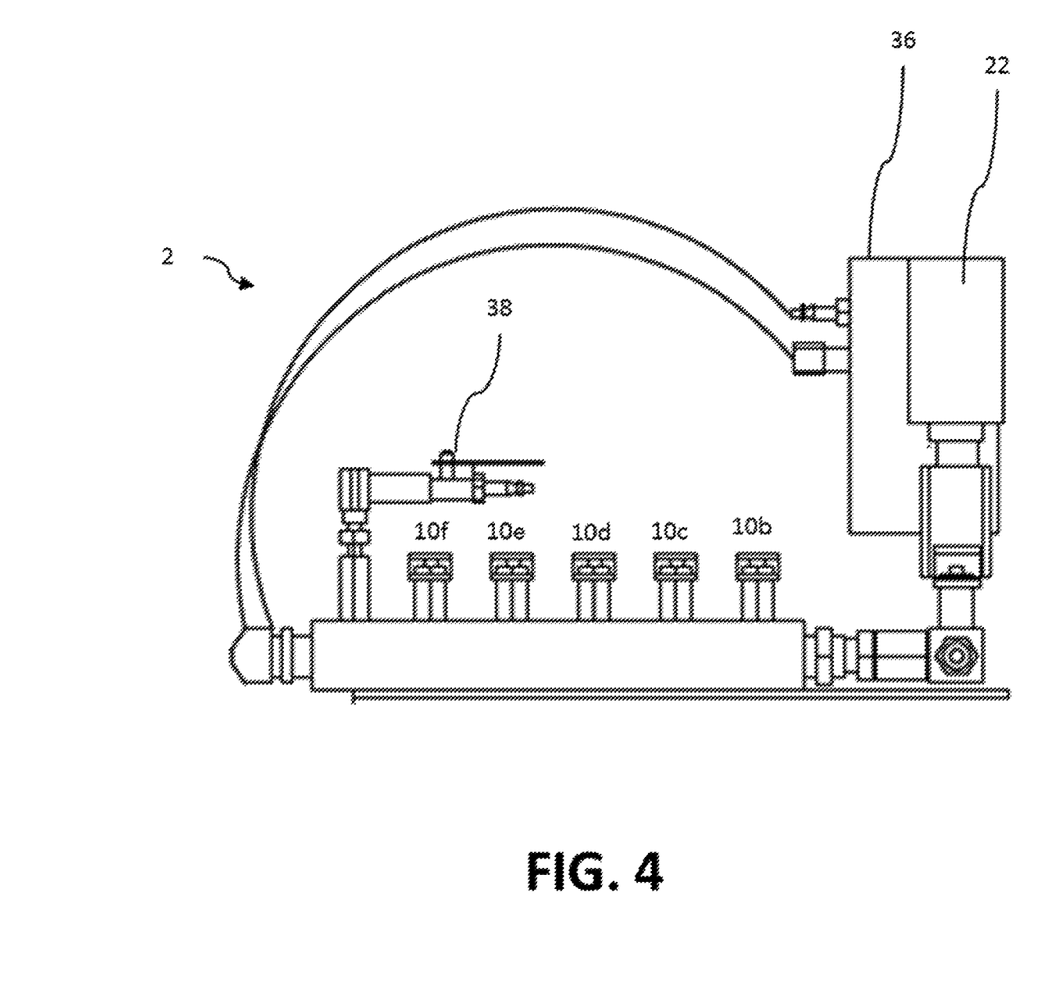
FIG. 4 is a right side view drawing showing one embodiment of the testing device of the present invention.

Turning to the figures, the structure of the device and system of the present invention may be described. The device 2 of the present invention includes a main body 4 (the particular components of which are outlined more fully below) configured to connect to a supply source (preferably an air source, not shown) through a supply hose assembly 6 on one side of the main body 4 and to connect to an equipment (for purposes of describing the invention, the particular equipment referred to is a generator, not shown) through an equipment (generator) hose assembly 8 on the other side of the main body 4, as shown in FIG. 1. The device 2 is designed such that air from the supply source is introduced into the main body 4 of the device 2 through the supply hose assembly 6 and exits the main body 4 of the device 2 through the equipment hose assembly 8 such that as the air moves through the device 2 (particularly, if a leak is occurring, as the constant pressure of the supply source will overcome the decreasing equipment pressure caused by the leak) the differential pressure measured increases, indicating a leak is detected. Through a series of leak testing stages 10a-10f (described more fully below) the selective operation of the device 2 and manipulation of the air flow through the main body 4 of the device 2 will allow for the detection of a leak in the generator and ultimately the determination and calculation of the leak rate in the generator. While in the preferred embodiment, the main body 4, supply hose assembly 6, and equipment hose assembly 8 are each provided as individual components that can be assembled for use, the device 2 may also be manufactured as an integral piece such that no assembly is required for use. Likewise, while in the preferred embodiment of the device 2 of the present invention the components of the main body 4 itself are provided as individual components (or groups of components) that can be assembled for use, it is also contemplated that a single, integrally manufactured main body 4 may be provided. It is understood, however, that providing individual components that can be assembled on-site prior to use allows the device 2 to be more suitable for travel and storage between uses.

As noted above, the device 2 of the present invention includes a main body 4 that serves as the fluidic connection between the supply hose assembly 6 (which is connected to the air supply source) and the equipment hose assembly 8 (which is connected to the generator equipment). The main body 4 is made up of a number of leak determining stages 10a-10f fluidically connected in series. The preferred embodiment of the device includes six stages 10a-10f, as shown, with each stage 10a-10f detecting leaks in a discrete range. When using this six-staged preferred embodiment, the leak detection ranges from about 0.053 SCFD at the first stage 10a to more than 1200 SCFD at the sixth stage 10f. While the preferred embodiment includes six stages 10a-10f, it is contemplated that modifications to the device 2 may be made to include more or less stages 10a-10f as may be required by the particular leak testing scenario or equipment. In fact, in the preferred embodiment, six stages 10a-10f are presented, and stages four 10d, five 10e, and six 10f (the higher leak rate detecting stages), are removably connected to the remaining stages (one 10a, two 10b, and three 10c) and present a high flow rate adapter assembly. This high flow rate adapter assembly may not be required for particular leak testing scenarios where leak rates on the lower end but may be attached to the first three stages in scenarios where the leak rate may be higher, as more stages 10 will be required to accurately determine the leak rate for high leak scenarios (which will become apparent in light of the description of the method of use of the device 2 presented below).

Each stage 10a-10f of the main body includes a stage valve 12, each stage valve having an open position and a closed position, such that fluidic flow into each stage 10 can be controlled individually. It may be seen, then, that when a stage valve 12 is in the closed position, fluid (gas/air) flow through that stage 10 is prohibited and when the stage valve 12 is in the open position, fluid flow through the stage 10 is allowed. It is the effects observed on differential pressure during the fluid flow through a particular stage 10 that allows for the detection and determination of a leak rate (described more below with regard to the preferred method of use of the device 2 of the present invention). In addition to a stage valve 12, each stage 10 includes a specially manufactured orifice 14. The first stage 10a (Stage #1) includes a calibration valve orifice 16 for use in the calibration procedure described below. While traditional orifices are designed for flow control purposes (that is, they are designed to result in variations in flow), the orifices 14 of the present invention are for flow measurement purposes. That is, if there is a leak in the equipment being tested, some flow will be present and a differential pressure change will be observed. Through experimental testing, mathematical relationships matching leak rates to known differential pressures can be determined for particular orifice parameters. Later leak testing using the same orifice parameters allows for the mathematical equations to be used to determine the leak rate (based off a recorded differential pressure during testing). While it is certainly possible to utilize the present Invention with orifices having different parameters, in the preferred embodiment, 45 degree conicial orifices are used. In the preferred embodiment, the orifices have diameters of specific sizes, with the first stage through sixth stage orifice diameters being the following sizes: (a) first stage—0.004", (b) second stage—0.0059", (c) third stage—0.010", (d) fourth stage—0.020", (e) fifth stage—0.029", and (f) sixth stage—0.04". This allows for differential pressure observations even at very small flow rates.

As noted above, the device 2 includes a supply hose assembly 6 that is configured to connect the air supply source (not shown) to the main body 4 of the device 2, preferably through a precision 0-150 psi regulator 18. The supply hose assembly 6 preferably connects the air supply source and main body 4 using a flexible hose 20. The flexible hose 20 preferably includes a connected precision regulator 18 to allow for regulation of the air supply source into the main body 4 of the device 2 through the supply hose assembly 6. The supply hose assembly 6 connects to the supply source at one end and a supply isolation valve 22 at the main body 4 at its other end. The supply isolation valve 22 allows for the selective control of air supply into the main body 4 from the supply hose assembly 6 and air supply source. Furthermore, the inclusion of a stage valve 12 at each stage allows for the supply source to be fluidically connected (through the hose assembly 6 and supply isolation valve 22) to each stage 10 independently, which is important for the leak determining procedure described below. The supply hose assembly 6 also includes a pressure gauge 24 that is configured to record and display the supply pressure, as described below.

As noted above, the main body 4 of the device 2 is fluidically connected to the equipment to be tested (for example, a generator) through an equipment hose assembly 8. The equipment hose assembly 8 is connected at one end to the testing port of the generator (not shown) and at the other end to the main body 4 through an equipment isolation valve 26. The equipment isolation valve 26 is in fluidic connection with each of the stages 10 of the main body 4, similar to the supply isolation valve 22 discussed previously. The equipment hose assembly 8 preferably includes a flexible hose 28 for connected the main body 4 of the device 2 to the equipment being tested. In addition, the equipment hose assembly 8 includes a pressure gauge 30 that is configured to record and display the equipment pressure as described more fully below.

In the preferred embodiment, the main body 4 of the device 2 includes a bypass valve 34 fluidically connecting the supply isolation valve 22 at the inlet of the main body 4 and the generator isolation valve 26 at the exit of the main body. The bypass 34 allows for air supplied to the main body 4 from the supply source to bypass the stages 10 (so long as the stage valves 12 are in the closed position). The bypass valve 34 is useful in the device set-up procedure and leak testing procedure, as described below. In addition to the bypass valve 34, the main body of the device also includes a differential pressure gauge 36. In the preferred embodiment, the differential pressure gauge 36 is positioned along a fluidic path extending from the supply isolation valve 22 at the inlet of the main body 4 and the generator isolation valve 26 at the exit of the main body 4. The differential pressure gauge 36 allows for the recording and displaying of the differential pressure in the main body of the device 2 during leak testing procedures, as described below. In one embodiment, the main body 4 of the device also includes a bleeder 38 positioned between the supply isolation valve 22 and the bypass valve 34. The bleeder 38 is configured to allow the user to safely reduce the pressure in the testing device 2 to protect the differential pressure gauge 36 from over pressurizing. The bleeder 38 is typically only needed at the conclusion of leak testing, but could also be used to make small reductions in the pressure in the generator (such as 62 psi down to 60 psi to match OEM recommendations).

The accurate and expeditious leak testing procedures described below are possible using the device 2 described herein. In the preferred embodiment, in order to provide for easy transport and storage during use, the device 2 is a portable device capable of being stored and transported/shipped in a small container or protective case (for example, a 24"×36"×11" case). In the preferred embodiment, the testing device 2 is stored and carried in a portable and inexpensive case (preferably about 50 pounds, and costing less than about two thousand dollars using off-the shelf parts). It may be seen that the only additional equipment needed beyond the device is the equipment (generator) being tested and a clean, dry air supply capable of maintaining the OEM recommended test pressure. It should also be noted that the generator being tested should include an access or test port to connect the device 2 to the equipment for testing. For example, a test port on the generator would be required to connect the device 2 to the LCSW cooling circuit via the equipment hose assembly 8 described previously. In one embodiment, the device 2 is mounted to a bracket, sheet, or other structure 40. Alternatively, the device may be mounted permanently or semi-permanently to the equipment.

Having described the structure of the device 2 of the present invention, the preferred method of testing utilizing the device 2 of the present invention may be described. As noted above, while the invention is particularly suited for testing LCSW leaks or generator casing leaks in steam generators, the device 2 and method are not so limited and may be used for leak detection in any industrial equipment. In any event, the invention may be described herein with particular reference to generator leak testing. It should be noted that in generator leak testing, the procedure for leak testing in either LCSW applications or generator casing applications is nearly identical. However, due to the larger acceptable leak rates for generator casing leak scenarios, device and testing modifications may be required for generator casing leak testing. As noted previously, in one embodiment the device 2 may be configured such that a number of the stages 10 may be removable and presented as a high flow rate adapter assembly (including, for example, testing stages #4 through #6). These high flow rate stages 10 may, for example, be required for generator casing leaks but likely not for LCSW leak testing because, as indicated above with regard to the structure of the testing equipment, the preferred embodiment of the device 2 includes six stages 10 that detect leaks in discrete ranges, ranging from about 0.053 SCFD to more than 1200 SCFD. Thus, typically Stage #1 10a will capture the rate of most LCSW leaks unless it is a "major" leak likely from mechanical failure of a component (such as a cracked weld on a water header fitting), but even in such a case, Stages #2 10b or #3 10c would capture the rate of major LCSW leaks (some may, for example, be as high as 10 scfd, but most leaks will typically be in the 1 to 5 scfd range for LCSW leaks).

The device 2 of the present invention may be used for testing leaks from equipment according to the method described below. Generally speaking, the method of the present invention may include (a) certain steps for setting up and preparing the device 2 for testing, (b) certain steps for using the device 2 to detect leaks, (c) certain steps for evaluating the results of the testing procedure, and (d) certain steps for calibrating the device 2 if desired. In general, set up for LCSW testing and preparation of the testing device 2 begins with draining water from the equipment to be tested, drying out the LCSW as recommended, and pressurizing the equipment with clean dry instrument air to the desired test pressure, before connecting the testing device 2 to the equipment to be tested. Once the device 2 is connected, the equipment pressure into the main body 4 through the equipment hose assembly 8 and the inlet supply pressure to the main body 4 through the supply hose assembly 6 are stabilized before the steps of the testing procedure are carried out (for both LCSW and generator casing tests). The testing procedure steps are carried out until the leak rate is established with stabilization of the differential pressure gauge 38 reading. Certain data at the conclusion of the testing procedure steps is then used to determine leak results. In one embodiment, it may be necessary to carry out the calibration steps to make sure that the device 2 is adequately calibrated for accurate testing. A more detailed step-by-step description of each of these discrete procedures of the method of the present invention are described in more detail below.

As indicated above, before leak testing of the equipment can be performed, the equipment (e.g. generator) and testing device 2 must be prepared for the testing procedure. As noted above, the preferred embodiment of the present invention is used for leak testing generator equipment, and thus the method described herein will use the term generator for description purposes. The preparation procedure, for example, when the present invention is used for testing leak rates in generators, includes the step of first draining and drying out the generator LCSW, which is preferably accomplished by gravity draining the water from the generator and performing the recommended dry-out protocol. Once the generator winding has been emptied and dried out, the generator or generator winding is pressurized with air (typically at 60 psig, but may be up to 80 psig maximum). While the generator is prepared by draining and pressurizing, the testing device 2 is prepared by removing the device components from the portable carrying case and assembling the device 2 according to the description provided above. (Alternatively, the device 2 may be manufactured such that all of the components are integrated into a single, non-assembly required structure). In any event, the device 2 is fully assembled or otherwise provided in its fully assembled state for appropriate testing to take place. After providing the assembled testing device 2, the testing device 2 is preferably positioned near an air supply providing clean, dry instrument air. In the preferred embodiment, the device 2 is configured to extend between the generator testing port and the air supply, and it is preferred that the air supply be positioned near (within about 100 feet) of the generator test port. Of course, in scenarios where these equipment are separated by greater lengths, extension hoses (not shown) may be used to allow sufficient length to connect the device 2 to both the air supply and generator test port.

To ensure sufficient record keeping, it is preferred that the user records and enters pertinent information into the computer based calculation sheet (preferably an excel spreadsheet or other similar computerized software component, described more fully below). This information may include, for example, customer information, generator information, and other information related to the particular testing job being carried out. Various other testing parameters are preferably measured and recorded in the calculation sheet including the generator winding temperature (which may be recorded via a sampling of resistance temperature detectors (RTDs) or thermocouples) and barometric pressure. In the preferred embodiment based on the experiment and laboratory derived algorithms, temperature should be recorded in degrees Fahrenheit. Similarly, barometric pressure should be recorded in inches of mercury (inHg). Of course, it is understood that various modifications may be made to the algorithms and system such that metric measurements may be used. In the event leak test and calibration verification of the device is desired, the calibration procedure steps (described below) may be implemented at this point prior to carrying out the leak testing procedure steps in order to make sure the device is calibrated appropriately for testing.

After recordation of these parameters (and, if desired, calibration of the device according to the calibration steps described more fully below), the device 2 is connected to the equipment to be tested. With the supply isolation valve 22 and generator isolation valve 26 both in the closed position, the main body 4 of the device 2 is connected to the generator test access port with the generator hose assembly 8 as described previously. In needed or desired, industrial style quick connect fittings may be used to facilitate a tight connection. Similarly, the supply isolation valve 22 on the supply side of the device is connected to the air supply through the supply hose assembly 6 (including the precision regulator 18/) as described above. Thus, it may be seen, that the testing device 2 fluidically connects the generator and supply side hoses through the series of stages 10 described above. Once the testing device 2 is connected to the generator equipment through the equipment hose assembly 8 (and with the generator isolation valve 26 in the closed position), the generator pressure is measured and recorded via the generator pressure gauge 30 of the generator hose assembly 8.

After measuring the generator pressure, the supply pressure is measured. To measure the bypass valve 34 is first placed in the open position, allowing flow of the air supply through the main body 4 of the device 2 once the supply isolation valve 22 is opened (the flow will bypass the stages 10, as the stage valves 12 are in the closed position. Note, of course, that the air supply will not exit the main body 4 of the device 2 through the generator isolation valve 26 because the generator isolation valve 26 is in the closed position). Then, the user slowly opens the supply isolation valve 22 until the supply isolation valve 22 is in the fully open position. Then, the user continuously adjusts the precision regulator 18 to adjust the inlet pressure such that the supply pressure gauge 24 shows a pressure that matches the generator pressure recorded by the generator pressure gauge 30. For best leak testing results, the supply pressure and generator pressure are deemed to be a match when the supply pressure is equal to the generator pressure recorded previously plus approximately 0.3 to 1 psi (this will prevent backflow into the testing device main body 4). The generator isolation valve 26 is then opened slowly to let the pressures stabilize (as the supply pressure and generator pressure both are introduced in opposing directions). Both final pressures are then recorded. It is likely that it will take approximately 5 to 10 minutes for the generator pressure to stabilize due to the volume needed to increase and balance pressures. Furthermore, the stabilized pressures may not be exactly equal (a difference of approximately 0.1 to 0.4) due to drop across the device body because of a measurable/significant leak in the generator winding. Once both the supply inlet pressure and the generator pressure are stable (no longer changing), the pressures are recorded and the bypass valve 34 is closed to begin the leak test.

As indicated above, there are a series of steps that make up the leak test procedure of the present invention. It should be noted that once the testing procedure begins, it is important to continually monitor and adjust the supply inlet pressure using the regulator 18, making sure to maintain the pressure recorded during the initial measurement of the supply inlet pressure (at close of the bypass valve 34) to within 0.1 psig. With the bypass valve 34 and all stage valves 12 closed, the differential pressure of the pressure gauge 36 is observed for a period of time, preferably about five to ten minutes. If after the observation period ends (again, about five to ten minutes) the differential pressure remains at zero, a second observation period (about another 5 to 10 minutes) may be added before determining whether any change in the differential pressure is shown on the differential pressure gauge 36. If no change in the differential pressure is observed, there are no leaks detected (or there is an insignificantly small leak rate lower than 0.05 SCFD) and the testing procedure is completed. If the differential pressure begins to rise, however, a leak is occurring and the following additional steps must be performed to determine the rate of the leak occurring.

First, the first stage 10a stage valve 12 (Stage #1) is opened and the differential pressure is observed. If the differential pressure rises above a threshold value (in the preferred embodiment, for example, the threshold value is 25 inches $H_2O$ or higher), the first stage 10a (Stage #1) stage valve 12 is closed and the bypass valve 34 is slowly opened. A differential pressure gauge 36 having a threshold value of twenty-five inches $H_2O$ is preferred because the differential pressure gauge 36 utilized must be suitable for use with low leak rates. The preferred differential pressure gauge 36 reads differential pressure in the range of zero to thirty inches $H_2O$, and a threshold value of 25 inches $H_2O$ allows the gauge 36 to be used without being maxed out (which would push the needle of the analog gauge to the top, potentially damaging or decreasing the accuracy of the gauge). Once the pressures stabilize and the differential pressure returns to zero, the bypass valve 34 is closed and the stage valve 12 for the next stage 10 (here, the second stage 10b, or Stage #2) is opened. Again, the differential pressure is observed. If the differential pressure again rises to the threshold value or higher (e.g. 25 inches $H_2O$ or higher), the second stage 10b stage valve 12 is closed and the bypass valve 34 is slowly opened. Once the pressures stabilize (differential pressure will return back to zero) the bypass valve 34 is closed and the stage valve 12 for the next stage (here, the third stage 10c, or Stage #3) is opened. Again, the differential pressure is observed. For generator casing leaks, Stages #4 10d through #6 10f may also be needed (in such an event, the same process is repeated with those stages 10d-10f). If at any time for a particular stage 10 the differential pressure stays above zero but less than the threshold value (preferably the pressure gauge 36 has a maximum threshold value of 30 inches $H_2O$, but even more preferably the threshold value 25 inches $H_2O$ as described above), the user should allow for stabilization for approximately ten minutes to approximately one hundred twenty minutes (small leaks and smaller generator volumes will stabilize quicker than larger leaks in large machines) and record the pressures (supply, generator, and differential) in the appropriate space on the computerized calculation spreadsheet. The general guidelines for stabilization period wait times are provided in the summary of the invention above, but the timing of the stabilization period will generally change dependent upon the leak rate and testing parameters. In any event, the user should observe that the differential pressure remains unchanged for preferably a period of no less than twenty minutes before determining that stabilization has occurred. Based on the recorded information, calculations (which may, for example, be performed in an excel based test form provided with the testing equipment) are performed for the recorded differential pressure and adjustments are made to adjust the results to standard temperature and pressure for comparisons to OEM recommendations.

Once testing has taken place and stabilization has occurred at the appropriate final stage 10, the resulting data is entered into appropriate input fields in the included computer-based calculations sheet (such as an excel spreadsheet). The following information is entered into the spreadsheet in appropriate fields: (a) unit and customer information and date of test (this information may already be input during the set-up stage, and while is not necessary for calculation purposes, is important for maintaining complete records about the equipment being tested so appropriate repairs or remedies can be made), (b) the barometric pressure (in Hg) at the end of the test (as indicated above, starting barometric pressure is input during the set-up stage), (c) the winding temperature (degree F.) at the end of the test (as indicated above, starting temperature is input during the set-up stage), (d) test pressure (psig) at the inlet/source at the end of the test (as indicated by the inlet/source pressure gauge), and (e) the differential pressure at the end of the test in the input associated with the appropriate Stage number. After each of these data points are input into the appropriate fields, the computerized calculation sheet calculates the resulting leak rate in air, helium, and hydrogen, corrected to STP in standard cubic feet per day (SCFD). Generally speaking, 1 SCFD maximum (in air) is acceptable for most generator liquid cooled windings. One SCFD translates to a differential pressure of 12 inches $H_2O$ at 60 psig in Stage #1 of the device, therefore once the differential pressure observed during a test surpasses 12.5 to 13 inches $H_2O$, it would FAIL to meet a "leak free winding" status.

As indicated previously, if desired the user has the capability of calibrating the device 2 during the set-up procedure. The testing equipment is capable of being fine-tuned if found to be out of calibration by utilizing a calibration valve 16. To determine whether the device 2 needs to be calibrated, the following calibration steps are followed. First, the device 2 is fully assembled to provide the structure described above. Once assembled, the high and low side hoses of the differential pressure gauge 36 are disconnected. Next, the needle on the differential pressure gauge 36 is adjusted to zero (preferably using a small flat blade screwdriver provided with the calibration kit). The differential pressure hoses are then reconnected. Then, the generator pressure gauge 30 and the inlet/supply pressure gauge 24 (which are preferably digital pressure gauges) are removed and zeroed before being reconnected to the remaining components of the device 2. With all valves closed, a provided calibration link or plug (not shown) is inserted into the generator side quick connect. The bypass valve 34 is then opened followed by the inlet valve 22, which is opened and adjusted to a pressure of 60 psig. The generator valve 26 is slowly opened until the pressures stabilize. Once the pressures stabilize, the bypass valve 34 is closed. After the bypass valve 34 has been closed, the first stage 10a (Stage #1) stage valve 12 is opened and the differential pressure is allowed to stabilize (for approximately 20 to 30 minutes) and the final pressure value is recorded. The resulting differential pressure should preferably be 9 in $H_2O$ (this translates to a leak rate of about 0.71 SCFD).

Taking into account varying atmospheric conditions at the time of calibration, if there is a difference of plus or minus 10 percent or greater in the differential pressure (i.e., if the differential pressure is less than about 8 in $H_2O$ or more than about 10 in $H_2O$), adjustment to the "calibration link" component of the device 2 may be required. If the first stage 10a (Stage #1) is determined to be out of calibration, with the unit still pressurized and the calibration plug installed, the set screw on the calibration knob is unlocked (an Allen wrench may be provided in the calibration kit to facilitate this step). The calibration knob may be tightened (turning clockwise) if the differential pressure reading is too low, or alternatively, may be loosened (turning counterclockwise) if the different pressure reading is too high. The calibration knob may be turned until the differential pressure settles on 9 in H$_2$O, and then the knob is locked in place. To make sure the calibration has worked, the device should be allowed to settle for 15 to 30 minutes and, if necessary, the knob should be readjusted. Because of the sensitivity of the knob adjustment, adjustment should only be performed if the differential pressure is out of the desired range described above.

In addition to calibration of the device, if desired a device leak test can be performed on the device to determine if any leaks are present in the device. To check the device 2 for leaks, the inlet valve 22 is closed and the generator valve 26 is closed (with nothing connected to the generator side of the device 2). The bypass valve 34 is then opened. The precision regulator 18 is adjusted to 60 psig and then the inlet valve is opened 22. The device 2 is pressurized with clean dry air to 60 psig. After allowing 1-2 minutes for stabilization, the inlet valve 22 is closed. Next, all stage valves 12 and the bypass valve 34 are closed. The pressure gauges 24, 30 and differential pressure gauge 36 are observed. If either pressure gauge 24, 30 drops more than about 0.2 psi in approximately 10 minutes, there is a leak in the device. If the differential pressure gauge 36 moves below zero, there is a leak on the inlet side greater than on the generator side. If the differential pressure gauge 36 increases, there is leak on the generator side greater than on the inlet side. If the differential pressure gauge 36 does not move, then there are no leaks present (or equal leaks exist on both sides). This condition can be verified by pressure gauge readings. If the differential pressure is zero and there is no drop in either gauge, the device has no leaks.

Experimental Testing and Results

A 60 psig LCSW (small volume) positive pressure leak rate experimental test was performed at a nuclear power generating station utilizing the equipment and procedure of the present invention. The tester determined that the results were accurate, repeatable, and comparable to the results obtained by the conventional 24 hour test. The results of the test utilizing the present invention, however, were obtained in less than three hours. Further experimental "sensitivity" testing was also performed with accurate and expected results. A generator stator frame leak rate test (large volume) was also successfully performed at another nuclear power station, with favorable results when compared to the traditional 24 hour testing procedures.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The invention claimed is:

1. A method useful for determining a leak rate from an equipment, the method comprising the steps of:
   a. providing a leak testing device comprising:
      i. a supply isolation valve having an open position and closed position;
      ii. an equipment isolation valve have an open position and closed position;
      iii. a main body fluidically connecting the supply isolation valve and equipment isolation valve, the main body comprising:
         a. a number of leak determining stages fluidically connected in series between the supply isolation valve and the equipment isolation valve, each of the stages comprising an orifice and a stage valve having an open position and closed position, wherein the stage valve of each stage allows for selective fluidic flow through each of the particular stage orifices independently;
         b. a bypass valve positioned in a fluidic path between the supply isolation valve and the equipment isolation valve, the bypass valve having an open position and a closed position; and
         c. a differential pressure gauge positioned in a fluidic path between the supply isolation valve and the equipment isolation valve and configured to record a differential pressure through the leak testing device;
      iv. a supply hose assembly fluidically connected to the supply isolation valve and configured to be connected to a supply source, wherein the supply isolation valve is configured to provide selective fluidic flow into the central body from the supply source through the supply hose assembly; and
      v. an equipment hose assembly fluidically connected to the equipment isolation valve and configured to be connected to the equipment, wherein the equipment isolation valve is configured to provide selective fluidic flow from the main body into the equipment hose assembly;
   b. with the equipment isolation valve in the closed position, connecting the equipment hose assembly of the testing device to the equipment, thereby introducing an equipment pressure from the equipment into the equipment hose assembly;
   c. measuring the equipment pressure by an equipment pressure gauge of the equipment hose assembly;
   d. with the supply isolation valve in the closed position, connecting the supply hose assembly of the testing device to the supply source, thereby introducing a supply pressure from the supply source into the supply hose assembly;

e. with the bypass valve in the open position, incrementally opening the supply isolation valve, thereby introducing the supply pressure into the main body, until the supply pressure matches the measured equipment pressure;

f. incrementally opening the equipment isolation valve until both the equipment pressure and supply pressure stabilize;

g. after the equipment pressure and supply pressure stabilize, closing the bypass valve;

h. testing the equipment for a leak, wherein testing the equipment for the leak comprises the steps of:
  i. with the bypass valve in the closed position and each of the stage valves in the closed position, determining whether the differential pressure recorded by the differential pressure gauge increases;
  ii. if the differential pressure increases, opening the stage valve for the first stage, thereby allowing flow through the first stage orifice;
  iii. with flow through the first stage orifice, determining whether the differential pressure increases beyond a threshold value;
  iv. if it is determined that the differential pressure increases beyond the threshold value with flow through the first stage orifice, closing the first stage stage valve, thereby stopping flow through the first stage orifice, and opening the bypass valve, thereby allowing the differential pressure to return to below the threshold value;
  v. once the differential pressure has returned to below the threshold value, closing the bypass valve and opening the stage valve for the next stage, thereby allowing flow through the next stage orifice;
  vi. with flow through the next stage orifice, determining whether the differential pressure increases beyond the threshold value;
  vii. if it is determined that the differential pressure increases beyond the determined threshold value with flow through the next stage orifice, closing the next stage stage valve and opening the bypass valve, thereby allowing the differential pressure to decrease;
  viii. repeating steps (I) through (n) for each stage in the series of stages until the differential pressure stabilizes at a value below the threshold value; and
  ix. when the differential pressure stabilizes at a value below the threshold value, recording the supply pressure, equipment pressure, and differential pressure at the time of stabilization; and i. calculating the leak rate from the equipment using the supply pressure, equipment pressure, and differential pressure at the time of stabilization.

2. The method of claim 1, wherein the equipment comprises a generator.

3. The method of claim 1, wherein the equipment comprises a liquid cooled generator stator winding.

4. The method of claim 1, wherein the number of leak determining stages is six.

5. The method of claim 1, wherein the differential pressure threshold value is in the range of twenty-five inches $H_2O$ to thirty inches $H_2O$.

6. The method of claim 1, further including the step of, prior to testing the equipment for a leak, calibrating the testing device.

7. The method of claim 1, wherein the step of calculating the leak rate comprises inputting the supply pressure, equipment pressure, and differential pressure at the time of stabilization into a software program comprising one or more algorithms configured to calculate the leak rate.

8. A device useful for determining a leak rate of an equipment, the device comprising:
  a. a supply isolation valve having an open position and closed position;
  b. an equipment isolation valve having an open position and closed position;
  c. a main body fluidically connecting the supply isolation valve and the equipment isolation valve, the main body comprising:
    i. a number of leak determining stages fluidically connected in a series between the supply isolation valve and the equipment isolation valve, each of the stages comprising an orifice and a stage valve having an open position and closed position, wherein the stage valve of each stage allows for selective fluidic flow through each of the particular stage orifices independently;
    ii. a bypass valve positioned in a fluidic path between the supply isolation valve and the equipment isolation valve, the bypass valve having an open position and a closed position; and
    iii. a differential pressure gauge positioned in a fluidic path between the supply isolation valve and the equipment isolation valve and configured to record a differential pressure through the testing device;
  d. a supply hose assembly configured to fluidically connect the supply isolation valve to a supply source; and
  e. an equipment hose assembly configured to fluidically connect the equipment isolation valve to the equipment;

wherein each of the supply isolation valve, the equipment isolation valve, the bypass valve, and each of the stage valves are selectively operable to move between an open position and a closed position, thereby allowing for fluidic flow through the device and for the determination of the leak rate of the equipment.

9. The device of claim 8, wherein the main body further comprises a bleeder.

10. The device of claim 8, wherein the equipment comprises a generator.

11. The device of claim 8, wherein the equipment comprises a liquid cooled generator stator winding.

12. The device of claim 8, wherein each of the stage orifices comprises a 45 degree conic edge orifice.

13. The device of claim 8, wherein the number of leak determining stages is six.

14. The device of claim 8, wherein a first portion of the leak determining stages are configured to be removably connected to a second portion of the leak determining stages, wherein the first portion forms a high flow rate adapter assembly.

* * * * *